USO10293809B2

United States Patent
Cho et al.

(10) Patent No.: US 10,293,809 B2
(45) Date of Patent: May 21, 2019

(54) SHIFTING CONTROL METHOD FOR HYBRID VEHICLES

(71) Applicants: HYUNDAI MOTOR COMPANY, Seoul (KR); KIA MOTORS CORPORATION, Seoul (KR)

(72) Inventors: Sung Hyun Cho, Yongin-si (KR); Ju Hyun Nam, Bucheon-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 157 days.

(21) Appl. No.: 15/644,065

(22) Filed: Jul. 7, 2017

(65) Prior Publication Data

US 2018/0162362 A1 Jun. 14, 2018

(30) Foreign Application Priority Data

Dec. 12, 2016 (KR) .......................... 10-2016-0168252

(51) Int. Cl.
*B60W 10/02* (2006.01)
*B60W 10/06* (2006.01)
(Continued)

(52) U.S. Cl.
CPC ............ *B60W 20/15* (2016.01); *B60W 10/02* (2013.01); *B60W 10/06* (2013.01); *B60W 10/08* (2013.01);
(Continued)

(58) Field of Classification Search
CPC ...... B60W 10/02; B60W 10/06; B60W 10/08; B60W 10/113; B60W 2510/0275;
(Continued)

(56) References Cited

U.S. PATENT DOCUMENTS 8,287,429 B2 * 10/2012 Kumazaki .............. B60K 6/445
477/115
8,882,632 B2 * 11/2014 Kumazaki ................ B60K 6/48
477/3
(Continued)

FOREIGN PATENT DOCUMENTS

| JP | 37755424 B2 | 5/2016 |
| KR | 10-2012-0082623 | 7/2012 |
| KR | 10-1382941 | 4/2014 |

*Primary Examiner* — David R Morris
(74) *Attorney, Agent, or Firm* — Brinks Gilson & Lione

(57) ABSTRACT

The present disclosure relates to a shifting control method that improves driving stability by reducing roll-back of a vehicle during the process of shifting on an uphill slope. The shifting control method for a hybrid vehicle includes: determining a degree of roll-back of the vehicle on the basis of a change in the number of revolutions of a transmission input shaft, when power-off down-shifting into a lowest gear is requested; decreasing a disengaging clutch torque, increasing an engaging clutch torque, and increasing a motor torque so that the motor torque follows a desired motor torque, when the degree of roll-back is equal to or greater than a set value; synchronizing a motor speed with an engaging input shaft speed by decreasing the motor torque, when the disengaging clutch torque is equal to or less than a set torque; and finishing the shifting by increasing the motor torque when the synchronization is finished.

6 Claims, 3 Drawing Sheets

(51) Int. Cl.
   *B60W 10/08* (2006.01)
   *B60W 10/113* (2012.01)
   *B60W 20/15* (2016.01)
   *B60W 30/18* (2012.01)
   *B60W 30/19* (2012.01)

(52) U.S. Cl.
   CPC .... *B60W 10/113* (2013.01); *B60W 30/18063* (2013.01); *B60W 30/18118* (2013.01); *B60W 30/19* (2013.01); *B60W 2510/0275* (2013.01); *B60W 2510/083* (2013.01); *B60W 2510/1015* (2013.01); *B60W 2710/021* (2013.01); *B60W 2710/027* (2013.01); *B60W 2710/081* (2013.01); *B60W 2710/083* (2013.01); *B60W 2710/1005* (2013.01); *B60Y 2200/92* (2013.01); *Y10S 903/93* (2013.01)

(58) Field of Classification Search
   CPC ... B60W 2510/0657; B60W 2510/083; B60W 2510/1015; B60W 2510/102; B60W 2710/021; B60W 2710/027; B60W 2710/0644; B60W 2710/0666; B60W 2710/081; B60W 2710/083; B60W 2710/1005

See application file for complete search history.

(56) References Cited

U.S. PATENT DOCUMENTS

| | | | | |
   |---|---|---|---|---|
   | 9,616,895 | B2* | 4/2017 | Nefcy | B60W 10/08 |
   | 10,029,694 | B2* | 7/2018 | Sharp | B60W 30/1882 |
   | 10,099,693 | B2* | 10/2018 | Cho | B60W 30/18127 |
   | 2012/0077638 | A1* | 3/2012 | Kumazaki | B60K 6/365 |
   | | | | | 477/5 |
   | 2013/0210575 | A1* | 8/2013 | Kumazaki | B60K 6/48 |
   | | | | | 477/20 |
   | 2013/0296100 | A1* | 11/2013 | Nefcy | B60W 10/08 |
   | | | | | 477/4 |
   | 2015/0337952 | A1* | 11/2015 | Cho | B60W 10/10 |
   | | | | | 701/54 |
   | 2016/0123465 | A1* | 5/2016 | Cho | F16H 63/46 |
   | | | | | 477/176 |
   | 2016/0377129 | A1* | 12/2016 | Cho | F16D 48/068 |
   | | | | | 701/51 |
   | 2017/0101101 | A1* | 4/2017 | Cho | B60W 30/18127 |

* cited by examiner

SHIFTING CONTROL METHOD FOR HYBRID VEHICLES

CROSS REFERENCE TO RELATED APPLICATION

This application claims priority to and the benefit of Korean Patent Application No. 10-2016-0168252, filed Dec. 12, 2016, which is incorporated herein by reference in its entirety.

FIELD

The present disclosure relates to a shifting control method for a hybrid vehicle.

BACKGROUND

The statements in this section merely provide background information related to the present disclosure and may not constitute prior art.

When shifting into a gear, a driver selects an optimal gear for transmitting desired power to wheels of a vehicle on the basis of the road state or the driving state of the vehicle and then shifts into the gear at the point of time when shifting is desired. That is, shifting is achieved in the vehicle against the resistance of a slope in accordance with the driver's intention.

Shifting is determined on the basis of a shifting pattern that is determined by various states of roads and the driver's intention.

Meanwhile, in the system of a hybrid vehicle equipped with a Dual Clutch Transmission (DCT), shifting is performed immediately until the vehicle is stopped in some cases, unlike vehicle equipped with an engine-transmission mechanism.

That is, when shifting into a lower gear is performed while a vehicle is driven, clunking noise is produced, so drivers shift almost immediately before stopping a vehicle to reduce noise and vibration.

We have discovered that when drivers shift almost immediately before stopping a vehicle in this way even on an uphill slope, the vehicle may be pulled backward when the power of the vehicle is insufficient.

SUMMARY

The present disclosure provides a shifting control method for a hybrid vehicle, and the method improves stability of driving by reducing roll-back during shifting on an uphill slope.

In one form of the present disclosure, a shifting control method for a hybrid vehicle includes: a roll-back determining step in which when a power-off down-shifting into a lowest gear is requested, a controller determines a degree of roll-back of a vehicle on the basis of a change in the number of revolutions of a transmission input shaft; a motor torque increasing step in which when the degree of roll-back is equal to or greater than a set value, the controller decreases a disengaging clutch torque, increases an engaging clutch torque, and increases a motor torque so that the motor torque follows a desired motor torque; a synchronization control step in which when the disengaging clutch torque is equal to or less than a set torque, the controller synchronizes a motor speed with an engaging input shaft speed by decreasing the motor torque; and a shifting finishing step finishing the power-off down shifting by increasing the motor torque when the synchronization is finished.

In the roll-back determining step, it may be determined whether the number of revolutions of a disengaging input shaft that is rotated backward is equal to or greater than a set number of revolutions.

In the motor torque increasing step, the motor torque may be linearly increased by adding a predetermined amount to the motor torque in an immediately previous control cycle, and the engaging clutch torque is increased by adding the increase of the motor torque to the engaging clutch torque in the immediately previous control cycle.

In the synchronization control step, a decrease of the motor torque based on the degree of roll-back of the vehicle may be determined and the motor torque may be decreased.

In the synchronization control step, the engaging clutch torque may be increased to a desired engaging clutch torque by adding a predetermined amount to a transmission input torque.

The motor torque may be decreased before the lowest gear is engaged in response to the power-off down-shifting request to shift into the lowest gear.

In forms of the present disclosure, roll-back of a vehicle is significantly reduced in the process of shifting into the first gear from the second gear on an uphill slope by increasing the power from a motor and by synchronizing the motor. Thus driving stability of the vehicle is enhanced, and braking capability is improved.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
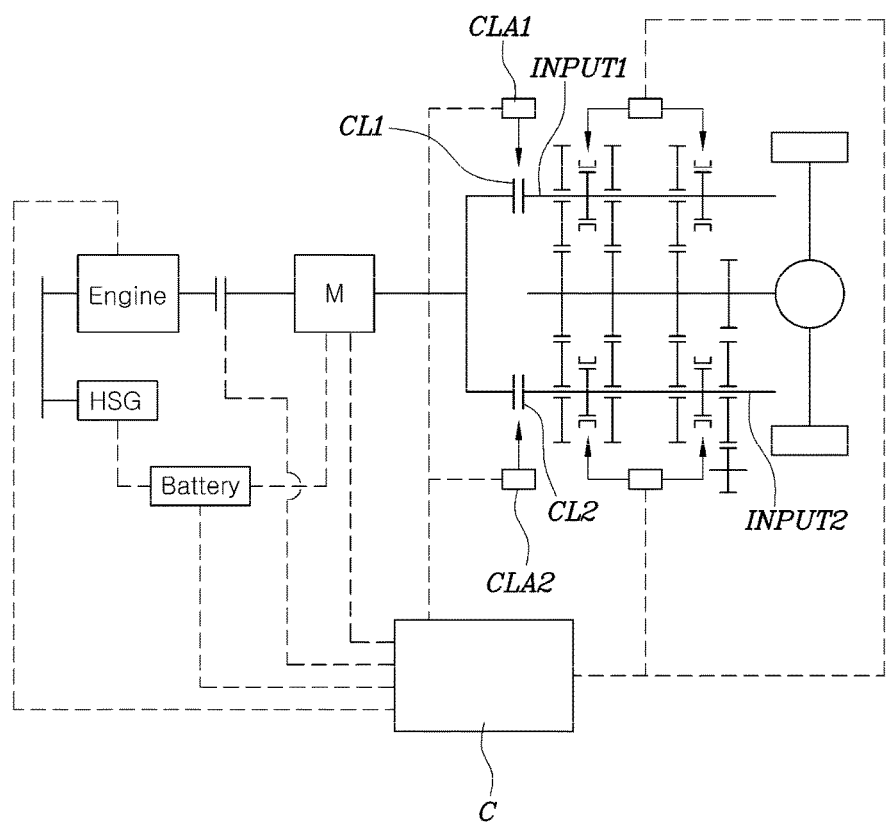
FIG. 1 is a diagram schematically showing the entire configuration of a hybrid vehicle equipped with a DCT that can be applied to the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

The present disclosure can be applied to a hybrid vehicle equipped with a DCT, as shown in FIG. 1.

Referring to the figures, an engaging clutch and a disengaging clutch of two clutches of a DCT are indicated by 'CL1' and 'CL2', respectively, an engaging clutch actuator and a disengaging clutch actuator for engaging and disengaging the clutches are indicated by 'CLA1' and 'CLA2', respectively, and an engaging input shaft and a disengaging input shaft are indicated by 'INPUT1' and 'INPUT2', respectively.

However, this is only for helping convenience of understanding the present disclosure, and the engagement and the disengagement may be changed, depending on which clutch is the clutch engaged with the current gear and which clutch will be engaged with a desired gear.

A shifting control method of a hybrid vehicle of the present disclosure may include a roll-back determining step, a motor torque increasing step, a synchronization control step, and a shifting finishing step.

Figure 2:
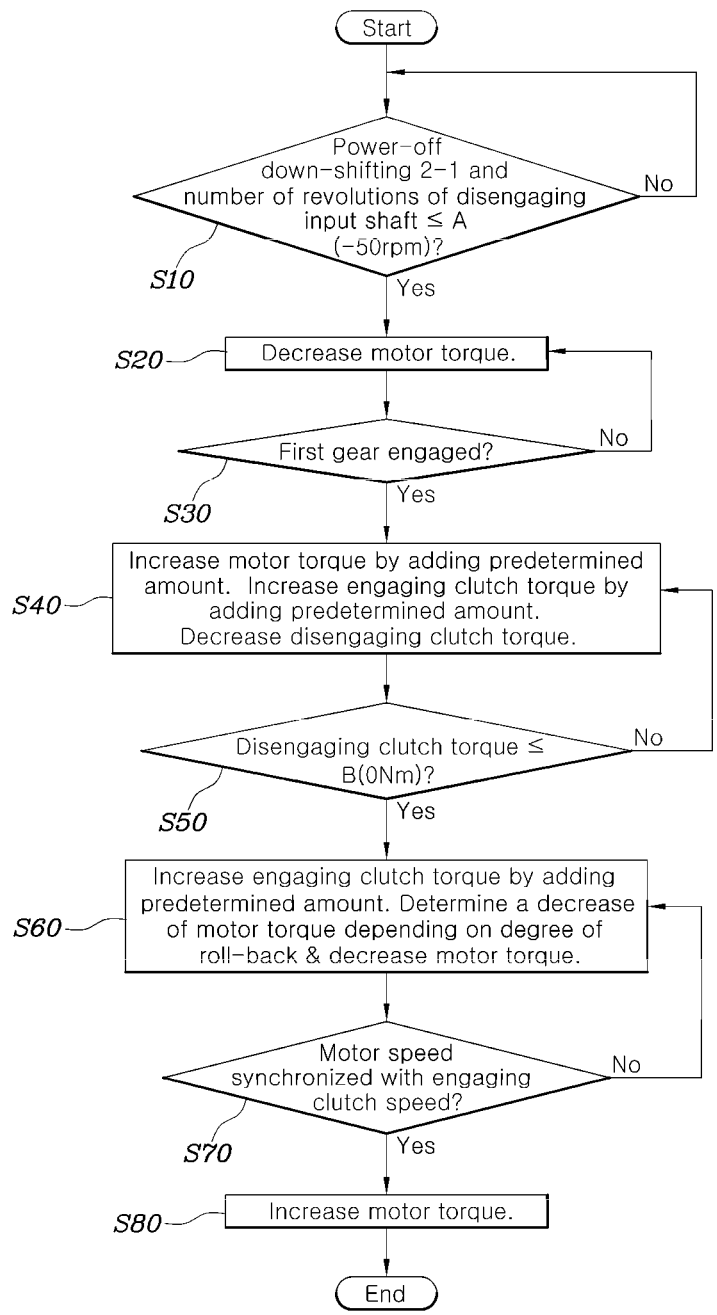
FIG. 2 is a flowchart illustrating the flow of shifting control in one form of the present disclosure.
Figure 3:
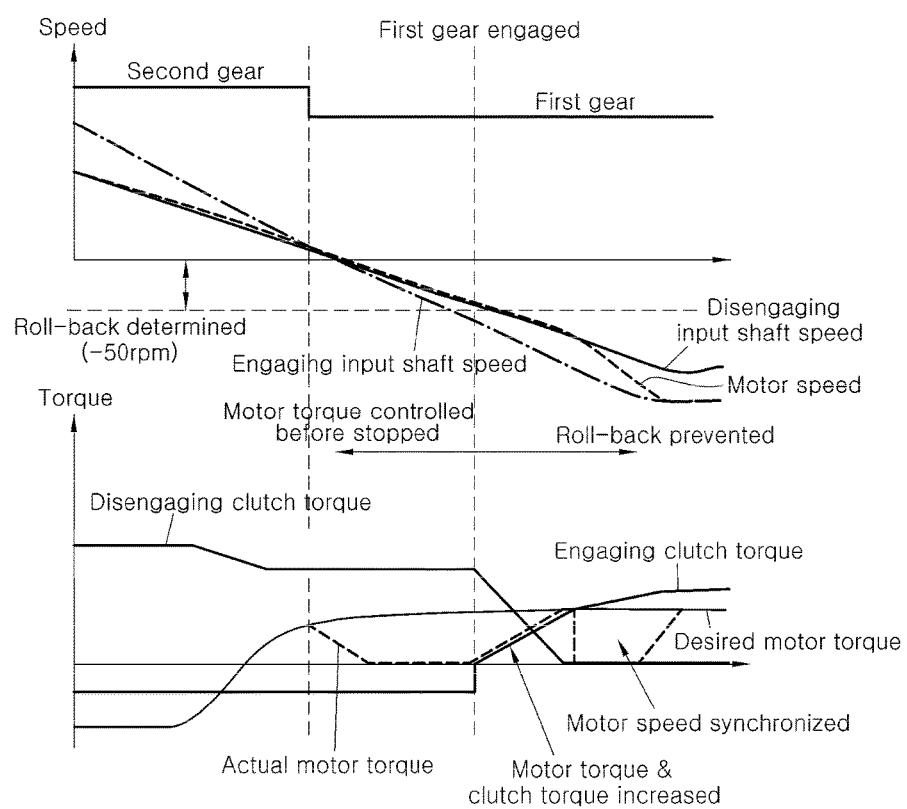
FIG. 3 is a diagram illustrating the operation state during shifting control in one form of the present disclosure.

Referring to FIGS. 2 and 3 to describe the present disclosure in detail, first, in the roll-back determining step, when there is a request for power-off down-shifting into the lowest gear, a controller "C" can determine the amount of roll-back of a vehicle on the basis of a change in the number of revolutions of a transmission input shaft.

The 'power-off down-shifting' means shifting into a lower gear from the current gear in accordance with a shifting pattern without a driver pressing down the accelerator pedal.

In detail, for the degree of roll-back, it is possible to determine whether the number of revolutions of the disengaging input shaft that is rotated backward is a set number of revolutions or more.

For example, it is possible to determine whether the number of revolutions of the disengaging input shaft exceeds −50 RPM in the process of shifting down into the first gear from the second gear immediately before stopping a vehicle that is being driven forward on an uphill slope.

In the motor torque increasing step, the degree of roll-back is equal to or greater than a predetermined value, and the controller "C" can increase motor torque so that the motor torque follows desired motor torque by decreasing the disengaging clutch torque and by increasing the engaging clutch torque.

For example, when an instruction to shift down is given, a profile of desired motor torque can be produced on the basis of various signals that are inputted in the shifting, in which when the first gear is engaged, motor torque can be increased to follow the desired motor torque, and the engaging clutch torque and the disengaging clutch torque can be controlled to cross each other.

To this end, before the lowest gear is engaged in response to the request to shift into the lowest gear, it is possible to decrease the motor torque close to 0 Nm, so it is possible to increase the motor torque in the motor torque increasing step.

That is, regenerative braking is performed immediately until down-shifting is performed into the second gear from the first gear, but when the down-shifting is entered without the motor torque, which has been increased or decreased, the motor torque is transmitted to the even-numbered gears including the second gear and these gears are instantaneously reversed from the backward direction to the forward direction, so gear backlash noise is produced. Accordingly, the motor torque is decreased to reduce the noise.

In the synchronization control step, when the disengaging clutch torque is equal to or less than a set torque, the controller "C" can synchronize the motor speed with the engaging input shaft speed by decreasing the motor torque.

For example, in the motor torque increasing step, when the disengaging clutch torque is dropped to 0 Nm or less, the motor torque is rapidly decreased.

Accordingly, as the motor speed drops, slip of the disengaging input shaft speed and the motor speed increase, and thus, the motor speed can be synchronized with the engaging input shaft speed.

In the shifting finishing step, when the synchronization is finished, it is possible to increase the motor torque and finish shifting. For example, the motor torque can be linearly increased to follow the desired motor torque.

According to this configuration, when a vehicle is pulled backward due to insufficient power on an uphill slope in the process of down-shifting from the second gear to the first gear immediately before the vehicle is stopped, the power from the motor "M" is controlled to be maximally transmitted to the driving wheels by increasing again the power of the motor "M" and synchronizing the motor speed.

Accordingly, roll-back of the vehicle in the process of shifting on an uphill slope is reduced, so stable driving of the vehicle is provided and braking force is improved, and accordingly, the marketable quality of the vehicle is improved.

Further, in the motor increasing step of the present disclosure, the motor torque and the engaging clutch torque can be increased by adding a predetermined amount of torque, respectively.

For example, it is possible to linearly increase the motor torque by adding a predetermined amount of torque (1 Nm/10 ms) to the motor torque (t−1) in the immediately previous control cycle.

Motor torque (Tm)=Motor torque (t−1) in immediately previous control cycle+Ramp up torque (1 Nm/10 ms)

Further, it is possible to increase the engaging clutch torque by adding a predetermined amount of torque (1 Nm/10 ms), which is the increase of the motor torque, to the engaging clutch torque (t−1) in the immediately previous control cycle.

Engaging clutch torque (Tc)=Engaging clutch torque (t−1) in immediately previous control cycle+Ramp up torque (1 Nm/10 ms)

That is, it is possible to increase the engaging clutch torque as much as the increase of the motor torque.

Further, in the synchronization control step, it is possible to determine the amount of decrease of the motor torque depending on the degree of roll-back of the vehicle and to reduce the motor torque.

Further, in the synchronization control step, it is possible to increase the engaging clutch torque to the desired engaging clutch torque by increasing the transmission input torque by a predetermined amount (0.4 Nm/10 ms).

Engaging clutch torque (Tc)=Transmission input torque+Ramp up torque (0.4 Nm/10 ms)

That is, it is possible to determine the amount of decrease of the motor torque such that the larger the degree of roll-back, the more the motor torque decreases, and to control the motor torque.

Accordingly, the more the vehicle is pulled backward, the more quickly the motor speed is synchronized with the engaging input shaft speed, so the power from the motor "M" is more quickly transmitted to the driving wheels and thus the vehicle is pulled backward as little as possible.

Hereinafter, a shifting control process in one form of the present disclosure is described.

Referring to FIGS. 2 and 3, when power-off down-shifting into the first gear from the second gear is requested, it is determined whether the disengaging input shaft having the second gear thereon rotates backward with a number of revolutions over −50 RPM (S10).

When the disengaging input shaft rotates backward with the number of revolutions over −50 RPM, as the result of determination in S10, the motor torque is decreased to reduce noise/vibration (S20).

Next, it is determined whether the first gear is engaged (S30), and when the first gear is engaged, the disengaging clutch torque is decreased and the engaging clutch torque is increased to cross each other and the motor torque is increased by a predetermined amount (S40).

Next, it is determined whether the disengaging clutch torque is 0 Nm or less (S50), and when the disengaging clutch torque is 0 Nm or less, as the result of determination in S50, the amount of decrease of the motor torque is determined based on the degree of roll-back of the vehicle and the motor torque is decreased. Accordingly, the motor torque can be dropped and synchronized with the engaging input shaft speed (S60).

Thereafter, it is determined whether the motor speed is synchronized with the engaging input shaft speed (S70) and, when the synchronization is finished, the motor torque is increased again (S80) and shifting can be finished.

As described above, in one form of the present disclosure, roll-back of a vehicle is reduced by increasing the power from a motor and synchronizing the motor in the process of shifting into the first gear from the second gear on an uphill slope, whereby driving stability of the vehicle is provided and braking force is improved, so the merchantable quality of the vehicle is improved.

Although an exemplary form of the present disclosure has been described for illustrative purposes, those skilled in the art will appreciate that various modifications, additions and substitutions are possible, without departing from the scope and spirit of the present disclosure.

What is claimed is:

1. A shifting control method for a hybrid vehicle, the method comprising:
    a roll-back determining step in which when a power-off down-shifting into a lowest gear is requested, a controller determines a degree of roll-back of a vehicle on the basis of a change in a number of revolutions of a transmission input shaft;
    a motor torque increasing step in which when the degree of roll-back is equal to or greater than a set value, the controller decreases a disengaging clutch torque, increases an engaging clutch torque, and increases a motor torque so that the motor torque follows a desired motor torque;
    a synchronization control step in which when the disengaging clutch torque is equal to or less than a set torque, the controller synchronizes a motor speed with an engaging input shaft speed by decreasing the motor torque; and
    a shifting finishing step of finishing the power-off down-shifting by increasing the motor torque when the synchronization is finished.

2. The method of claim 1, wherein the roll-back determining step includes determining whether the number of revolutions of a disengaging input shaft that is rotated backward is equal to or greater than a set number of revolutions.

3. The method of claim 1, wherein the motor torque increasing step includes:
    linearly increasing the motor torque by adding a predetermined amount of torque to the motor torque in an immediately previous control cycle, and
    increasing the engaging clutch torque by adding the increase of the motor torque to the engaging clutch torque in the immediately previous control cycle.

4. The method of claim 1, wherein the synchronization control step includes determining a decrease of the motor torque based on the degree of roll-back of the vehicle, and decreasing the motor torque.

5. The method of claim 1, wherein the synchronization control step includes increasing the engaging clutch torque to a desired engaging clutch torque by adding a predetermined amount of torque to a transmission input torque.

6. The method of claim 1, wherein the motor torque is decreased before the lowest gear is engaged in response to the power-off down-shifting request to shift into the lowest gear.

* * * * *